(12) United States Patent
Uchida et al.

(10) Patent No.: US 9,209,975 B2
(45) Date of Patent: Dec. 8, 2015

(54) SECURE ACCESS OF ELECTRONIC DOCUMENTS AND DATA FROM CLIENT TERMINAL

(75) Inventors: Yuki Uchida, Toronto (CA); Chin Yoon, Seoul (KR); James Harrison, Hampton, NH (US)

(73) Assignees: RICOH COMPANY, LTD., Tokyo (JP); RICOH AMERICAS CORPORATION, West Caldwell, NJ (US)

( * ) Notice: Subject to any disclaimer, the term of this patent is extended or adjusted under 35 U.S.C. 154(b) by 792 days.

(21) Appl. No.: 12/251,880

(22) Filed: Oct. 15, 2008

(65) Prior Publication Data

US 2010/0095354 A1    Apr. 15, 2010

(51) Int. Cl.
| | |
|---|---|
| H04L 9/32 | (2006.01) |
| G06F 17/30 | (2006.01) |
| G06F 11/00 | (2006.01) |
| G06F 21/62 | (2013.01) |
| H04L 29/06 | (2006.01) |

(52) U.S. Cl.
CPC ............ *H04L 9/32* (2013.01); *G06F 17/30011* (2013.01); *G06F 21/6227* (2013.01); *H04L 63/08* (2013.01); *H04L 63/10* (2013.01)

(58) Field of Classification Search
CPC ........................... G06F 17/30011; H04L 9/32
USPC ........................................................... 726/4
See application file for complete search history.

(56) References Cited

U.S. PATENT DOCUMENTS

| | | | |
|---|---|---|---|
| 5,832,474 A * | 11/1998 | Lopresti et al. | ....................... 1/1 |
| 6,327,343 B1 | 12/2001 | Epstein et al. | |
| 6,760,721 B1 | 7/2004 | Chasen et al. | |
| 7,058,662 B2 | 6/2006 | Wiggins et al. | |
| 7,072,983 B1 | 7/2006 | Kanai et al. | |
| 7,451,217 B2 * | 11/2008 | Wardrop | ....................... 709/225 |
| 7,818,324 B1 * | 10/2010 | Held et al. | ....................... 707/741 |
| 8,301,781 B1 * | 10/2012 | Ludwig et al. | ............... 709/227 |
| 2004/0034688 A1 | 2/2004 | Dunn | |
| 2004/0054915 A1 | 3/2004 | Jong et al. | |
| 2005/0021980 A1 | 1/2005 | Kanai | |
| 2007/0011149 A1 | 1/2007 | Walker | |
| 2007/0088690 A1 | 4/2007 | Wiggen et al. | |
| 2007/0157100 A1 | 7/2007 | Wiggen | |
| 2007/0162967 A1 | 7/2007 | De Jong et al. | |
| 2009/0083831 A1 | 3/2009 | Kanai | |

FOREIGN PATENT DOCUMENTS

| | | |
|---|---|---|
| EP | 0935378 A2 | 8/1999 |
| EP | 1039398 A2 | 9/2000 |
| EP | 1507402 A1 | 2/2005 |
| EP | 1852798 A1 | 11/2007 |
| JP | 8-221443 | 8/1996 |
| JP | 2000-276387 | 10/2000 |
| JP | 2002-324024 | 11/2002 |

(Continued)

OTHER PUBLICATIONS

U.S. Appl. No. 12/112,709, filed Apr. 30, 2008.
Jun. 17, 2009 European search report in connection with a counterpart European patent application No. 09 15 6827.

(Continued)

*Primary Examiner* — Andrew Georgandellis
(74) *Attorney, Agent, or Firm* — Cooper & Dunham LLP (57) ABSTRACT

An improved approach for secure access of electronic documents and data is provided.

9 Claims, 9 Drawing Sheets

(56) References Cited

FOREIGN PATENT DOCUMENTS

| | | |
|---|---|---|
| JP | 2003-288099 | 10/2003 |
| WO | WO 01/79964 A2 | 10/2001 |
| WO | WO 2007/048432 | 5/2007 |

OTHER PUBLICATIONS

Bretherton, Francis P., et al., "Metadata: a User's View", IEEE Proceedings, pp. 166-174, Sep. 28, 1994.

Oct. 12, 2009 European search report in connection with a counterpart European patent application No. 09 15 6827.

\* cited by examiner

| Item | Image Data | Voice Data | Electronic Document |
|---|---|---|---|
| Data ID | | | |
| Data Type | 1 | 1 | 1 |
| Title of File | | | 1 |
| Date Created | | | 1 |
| Date last saved | | | 1 |
| Author | 1 | | 1 |
| Last Saved by | | | 1 |
| Company | | | 1 |
| Date of Call | | 1 | |
| Caller Name | | 1 | |
| Caller ID | | 1 | |
| Receiver Name | | 1 | |
| Receiver ID | 1 | 1 | |
| Date of Operation (print, copy, fax, scan) | 1 | | |
| User Name of operation | 1 | | |
| Type of Operation | 1 | | |
| Location of Original Data | 1 | 1 | 1 |
| | | | |
| | | | |
| | | | |

SECURE ACCESS OF ELECTRONIC DOCUMENTS AND DATA FROM CLIENT TERMINAL

TECHNICAL FIELD

This disclosure relates to systems, apparatuses and methodologies for managing electronic documents and data, and in particular, an approach that allows secure access of electronic documents and data from a client terminal.

BACKGROUND

In the current information age, it has often been discussed that proliferation of information technology (IT) can lead to more convenience, efficiency, productivity, enjoyment, etc., in life. The extensive use and development of IT facilities in an enterprise (or other organization) environment, as well as in a home environment, has been accompanied by escalating accumulations of electronic documents and data and documents.

The current IT trend, particularly for enterprises and other organizations, is to obtain data, document and application on-demand, in an outsourcing approach known nominally as Software as a Service (SaaS). SaaS is typically an IT approach wherein enterprises and users obtain access, over the Internet, to applications and related services that would otherwise have to be located in their own personal or enterprise computers.

SaaS is often a popular approach for enterprises because, instead of a major upfront investment (for example, tens of thousands to millions of dollars) to create and maintain IT infrastructure, the enterprise pays a monthly fee to access applications. In addition, such access is generally obtained, without a time-consuming in-house rollout of technology. Further, SaaS allows the enterprise to focus on its own operations, without requiring employing a full IT staff to maintain the applications.

In the current IT environment in which SaaS is the dominant approach, application, data (and document) storage and user interface are by default (that is, generally) hosted by the SaaS vendor at an off-site location. The customer can access this service via a web connection. However, such approach typically has vulnerabilities from data-thefts and slow performance, particularly when large quantities of data are being retrieved. Accordingly, many enterprises prefer to keep their electronic data and documents behind their own firewall, notwithstanding the attractiveness of the SaaS architecture.

There remains a need for an improved approach for managing electronic data and documents, to keep the documents and data on-site, allow a user to readily reference and/or obtain the electronic data and documents, and avoid a large and cumbersome software system on site for such data/document management and access.

BRIEF SUMMARY

This disclosure describes tools (in the form of systems, apparatuses and methodologies) for secure access of electronic data and documents maintained within an intranet from a user terminal that is within the intranet (or similar secure networked environment), while document and data management are provided by a SaaS-type management service (off-site).

In an aspect of this disclosure, a management service tracks the documents and data in a document database (on-site, that is, within the intranet), and when a document retrieval request is received from the user terminal, assuming the management service authenticates user credential information received from the user terminal, the management service transmits an authorization key and a pointer to the requested document in the document database to the user terminal. Such authorization key and pointer to the requested document allows the user terminal to obtain the requested document from the document database. On the other hand, the authorization key is generated for the specific user, and therefore user authentication information is supplied along with the authorization key to the document database.

The above-mentioned process can be transparent to the user, other than prompts, if necessary, to obtain user credential information. The user submits a document retrieval request from the user terminal, and the system operates autonomously thereafter, until the requested document is retrieved (or an error message is returned).

In another aspect of this disclosure, the management service maintains searchable metadata (off-site) for the documents in the document database. The metadata for a specific document can represent properties of the document and can include a hyperlink to the specific document in the document database. A monitor or agent (on-site) monitors access to documents and data in the document database and when an access event (for example, read, edit, insert delete, etc.) occurs, the monitor or agent captures access event metadata corresponding to the access of the specific document and transmits the access event metadata through the network to the management service. When the management service receives access event metadata corresponding to access of a specific document in the document database, the management service updates metadata maintained for the specific document, based on the access event metadata.

In yet another aspect of this disclosure, the management service allows the user to log-in through the network and query (that is, submit a search request for searching) the metadata to find desired documents or data. The management service compares the query to the metadata maintained for the documents in the document database, and returns search results (for example, a list of documents in the document database that match the query, with associated information, such as selected properties of the documents). The user can then select one or more documents from the search results, displayed through a user interface of the user terminal, and a document retrieval request for the selected documents is generated and transmitted to the management service (thereby triggering the above-mentioned process at the management service for a document retrieval request).

BRIEF DESCRIPTION OF THE DRAWINGS

The features of this disclosure can be more readily understood from the following detailed description with reference to the accompanying drawings wherein:

FIG. 11 shows a block diagram of a system, according to another exemplary embodiment.

DETAILED DESCRIPTION

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

Figure 1:
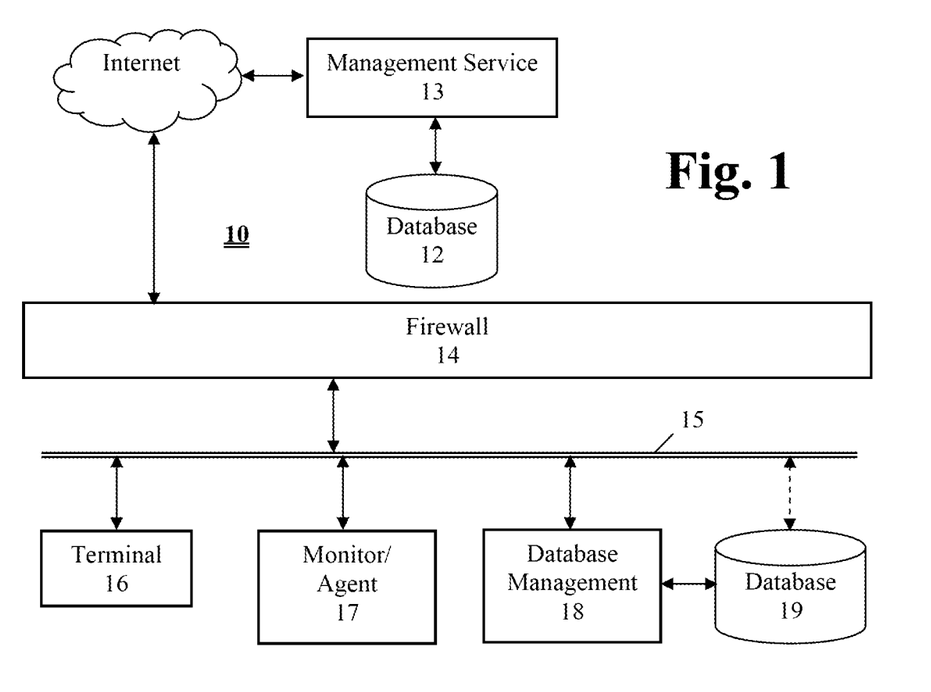
FIG. 1 shows a block diagram of a system, according to an exemplary embodiment of this disclosure.

Referring now to the drawings, wherein like reference numerals designate identical or corresponding parts throughout the several views, FIG. 1 shows schematically operations of a system for managing electronic documents and data, in an example of this disclosure.

System 10 includes a user terminal 16, an agent or monitor part 17, and a database management part 18 and database (or storage part) 19, all of which are interconnected by a network 15 (typically, a secure intranet or extranet). In addition, the user terminal 16, as well as other components connected to the network 15, can access the Internet, with a firewall 14 provided between the network 15 and the Internet. Thus, the user terminal 16 can communicate with management service 13 through the Internet.

While the example shown in FIG. 1 includes one terminal (15) and one database (19), it should be appreciated that such numbers of terminals and databases are arbitrary and are selected as an example in order to facilitate discussion, and that the subject matter of this disclosure can be implemented in a system including one or more terminals and one or more databases or data storage parts. Further, it is noted that a terminal and a database or data storage part can be included in one integrated device (or of course can be separate devices).

The database 19 can comprise one or more structural or functional parts that have or support a storage function. For example, the database 19 can be, or can be a component of, a source of electronic data, such as an e-mail server, a file server, a multi-function peripheral device (MFP or MFD), a voice data server, an application server, etc. It should be appreciated that the term "electronic document" or "electronic data", as used herein, in its broadest sense, can comprise any data that a user may wish to access, retrieve, review, etc.

As mentioned above, a plurality of databases may be included in the system, and each database can store a corresponding type of data (for example, one database stores image data, another database stores electronic documents, and a third database stores voice data, etc.) or multiple types of data (for example, one database stores image data and e-mail data, another database stores electronic documents and application files, and a third database stores voice data, audio data, video data, multimedia files, etc.), with the type(s) of data stored in one database being mutually exclusive from, or alternatively overlapping with, the type(s) of data stored in another database. Further, the plurality of databases can be distinct parts (for example, resident in respective servers or multi-function devices), each connected to the network 15, or they may be resident in one device, such as a multi-function device wherein one database stores image data from scan operations in the multi-function device, another database stores image data from print operations in the multi-function device, a third database stores image data from facsimile operations in the multi-function device, etc. In any event, the management service 13 tracks and monitors the various types of data that are stored in the databases.

The management service 13 can be configured on a web server or on a backend server connected to the web server, to provide a user interface through the Internet to a user terminal through which a user can enter user credential information, as well as other information. The management service performs user authentication by using the user credential information. Once the user credential information has been authenticated, the web service proceeds to make its services available to the user terminal.

The management service 13 tracks the electronic documents in the document database 19, and maintains searchable metadata corresponding to properties of the electronic documents stored in the document database. The metadata maintained by the management service for a document stored in the document database can include properties information (for example, author, creation date, data type, document contents information, etc.) as well as a pointer to the physical address of the document.

The monitor or agent 17 monitors access to the document database, including all file events (for example, read, edit, insert, delete, etc.), and transmits access event metadata to the management service 13. When a file event occurs, the monitor or agent 17 captures the metadata of such event, and transmits it along with a hyperlink to the file that has been accessed. The metadata maintained by the management service is updated based on the access event metadata.

The monitor or agent 17 is shown in FIG. 1 as a separate component connected to the network 15. However, it should be appreciated that monitor or agent 17 is typically software running on one of the hardware components connected to network 15, such as the user terminal 16, the computer bearing the database management part 18 and/or database 19, another computer in the system, etc.

The user terminal 16 configured with software (for example, a browser) allowing the user terminal to communicate through the Internet with the management service can receive a user interface from the management service through which a user can enter user credential information (which may or may not be stored locally). After the user credential information has been authenticated, the user terminal 16 communicating with the management service 13 through the Internet can transmit a document retrieval request to the management service.

The document request part of the user terminal in the preferred embodiment in which the management service is a web service is a software configuration of a user interface for the user to enter user credential information (for example, user name, password, etc.) and specify a document or data requested to be retrieved. Alternatively, the document request part in another exemplary embodiment in which the management service is provided through another type of connection, such as a peer-to-peer connection, may be native software on the terminal.

When the management service receives a document retrieval request from a user terminal, the management service, in response to the document retrieval request, transmits an authorization key and a pointer indicating a physical address in the database 19 of the requested document. For example, the requested document can be a file in a storage device in the intranet (as noted above, the collection of electronic documents or data in the system can be distributed amongst a plurality of database or storage parts) and the pointer can include a hyperlink for accessing the file.

The user terminal 16 is further configured through software (an authorization processing part) to receive or intercept an authorization key and pointer from the management service 13, and automatically transmit a request to retrieve the requested document to the database management part 18. The request includes user authentication information, the pointer and the authorization key. Without such authorization key, the user terminal would not be permitted to obtain the requested document from the document database, even when the user terminal has the pointer to the requested document. On the other hand, the authorization key is generated for the specific user, and would not allow access to the requested document from the document database, unless user authentication information is supplied along with the authorization key to the document database.

When the database management part 18 receives a request to retrieve electronic documents and/or data in database 19, the database management part compares the user authentication information and the authorization key with access credentials associated with the requested document. In order to ensure secure access of the electronic documents and/or data in database 19, each document or data is associated with corresponding access credentials, and access to the document or data is allowed only when user authentication information and the authorization key match the access credentials associated with the requested document. If the request to retrieve the requested document is authenticated based on the comparison, the database management part 18 retrieves from the document database the requested document indicated by the pointer and transmits the retrieved document to the terminal 16.

On the other hand, in some instances, the user cannot identify the particular document that is desired. In such instance, the user can log-in to the management service and query the metadata maintained by the management service or otherwise submit a search request. The management service can supply a user interface to the user terminal for user entry of the search request. When the management service receives the search request, and assuming that user credential information from the user terminal has been authenticated, the management service searches, based on the search request, the metadata maintained for the electronic documents stored in the document database and transmits search results to the user terminal. The user using the search results user interface can select one or more documents from the search results, and a document retrieval request is formed based on the selection of the one or more documents from the search results.

The management service processes the document retrieval request based on the user selection of the one or more documents from the search results, and generates the authorization key for accessing the selected document and generates the pointer based on a hyperlink maintained in the metadata for the selected document.

Figure 2:
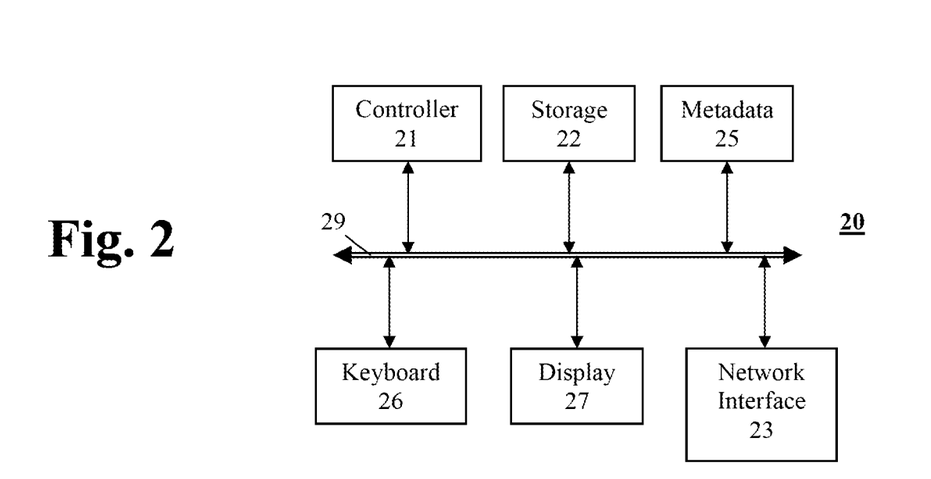
FIG. 2 shows a block diagram of a server that can be configured to provide the management service shown in FIG. 1.

FIG. 2 shows an exemplary constitution of a server that can be configured through software to provide management service 13. As shown in FIG. 2, server 20 includes a controller (or central processing unit) 21 that communicates with a number of other components, including memory or storage part 22, network interface 23, keyboard 26 and display 27, by way of a system bus 29.

The server may be a special-purpose device (such as including one or more application specific integrated circuits or an appropriate network of conventional component circuits) or it may be software-configured on a conventional personal computer or computer workstation with sufficient memory, processing and communication capabilities to operate as a server and/or web server, as will be appreciated to those skilled in the relevant arts.

In server 20, controller 21, memory/storage 22, network interface 23, keyboard 26 and display 27 are conventional, and therefore in order to avoid occluding the inventive aspects of this disclosure, such conventional aspects will not be discussed in detail herein.

Figure 5:
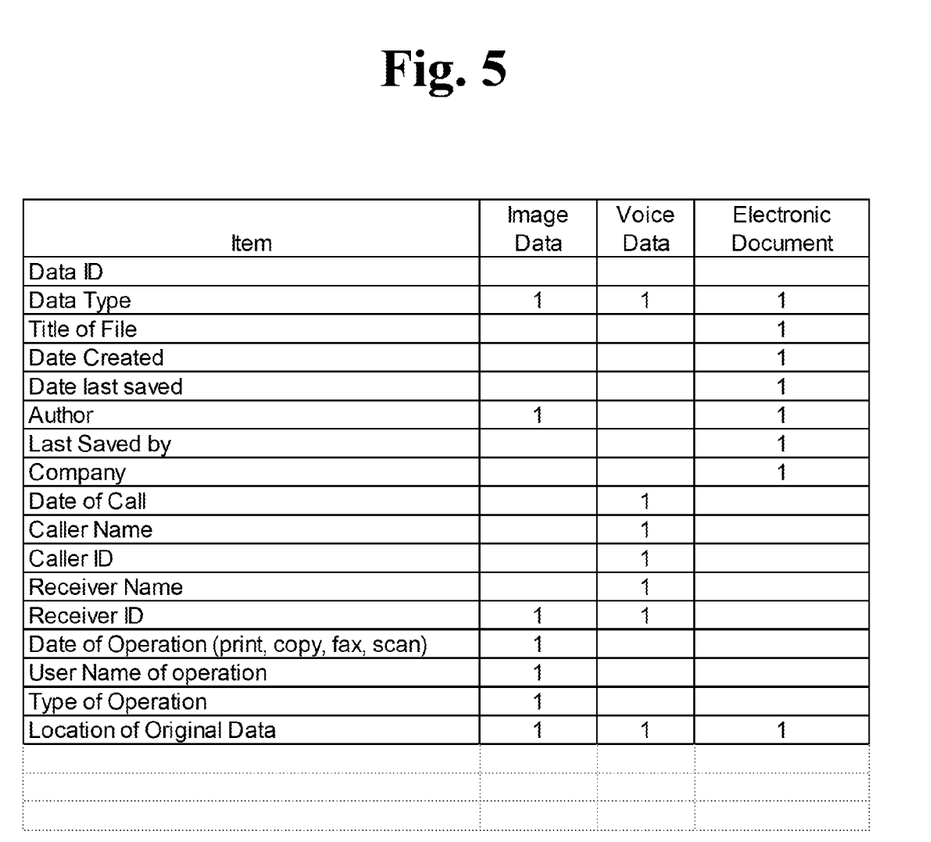
FIG. 5 shows an example of an index table.

The controller 21 executing program code instructions controls server operations, including maintaining metadata, such as in an index table. FIG. 5 shows an example of an index table. Data type and location of data are index items common to each type of data. In the example of FIG. 5, the index items for image data are author, receiver ID (such as network address of device from which data was received), type of operation (print, copy, fax, scan, etc.), date of operation and name of user who performed the operation, the index items for voice data are date of call, caller name, caller ID (that is, telephone number), receiver name and receiver ID, and the index items for electronic documents are title or name of file, date created, date last saved, author, last saved by and company.

It should be apparent that metadata maintained by the management service is not limited to the index items shown in FIG. 5 which merely present an example. Further, although metadata can be maintained in the form of an index table in the example of FIG. 5, it should be apparent to those skilled in the art that the metadata can be organized in any of various manners that do not involve a table. For example, such metadata or index data can be organized as data objects through object-oriented programming, and/or via linked lists, data linking, a dynamic or relational database, etc.

As mentioned above, the management service 13 tracks and monitors the various types of data that are stored in the database 19. For each specific electronic data, the management service 13 determines the data type of the specific electronic data, uses the index table to determine appropriate index items for the specific electronic data, and generates and maintains metadata corresponding to such appropriate index items for the specific electronic data.

As an example, metadata maintained for specific electronic image data can indicate an operation (e.g., print, facsimile, scan, etc.) last performed in connection with the specific electronic image data. In another example, the management service includes in metadata maintained for specific electronic mail data a copy of header and body data of the specific electronic mail data. As another example, the management service includes in metadata maintained for specific electronic voice data date, caller identification and receiver identification of the specific electronic voice data.

Maintenance and updates of metadata is also discussed in co-pending application Ser. No. 12/112,709, filed Apr. 30, 2008 and entitled "MANAGING ELECTRONIC DATA WITH INDEX DATA CORRESPONDING TO SAID ELECTRONIC DATA", the entire contents of which are incorporated herein by reference.

In the example shown in FIG. 2, the management service 20 includes the network interface 23 for communications through a network, such as communications through the Internet with the terminal 16, database management part 18 and/or database 19 in FIG. 1. However, it should be appreciated that the subject matter of this disclosure is not limited to such configuration. For example, the management service may communicate with the database through direct connections and/or through a network to which the user terminal is not connected. As another example, the management service need not be provided by a server that services client terminals, but rather may communicate with the terminal on a peer basis, or in another fashion.

The network 15 is preferably a secure intranet or extranet but can include one or more of a local area network, a wide area network, any type of network that allows secure access, etc., or a combination thereof. Further, other secure communications links (such as a virtual private network, a wireless link, etc.) may be used as well in the network 15. In addition, the network 15 preferably uses TCP/IP (Transmission Control Protocol/Internet Protocol), but other protocols can also be used. How devices can connect to and communicate over the network 15 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The user terminal 16 can be any computing device, including but not limited to a personal, notebook or workstation computer, a kiosk, a PDA (personal digital assistant), a mobile phone or handset, another information terminal, etc., that can communicate through the network 15 with other devices. Although only one user terminal is shown in FIG. 1, it should be understood that the system 10 can include a plurality of user terminal devices (which can have similar or different configurations).

The terminal 16 can interact (exchange data) with the management service 13 via the network 15, so as to benefit from the services provided by the server. For example, a document retrieval request can be sent from the terminal 16 to the management service 13. As another example, the terminal 16 can transmit other information as well, such as, for example, user identification, password, the name of the person operating the terminal, etc.

Figure 3:
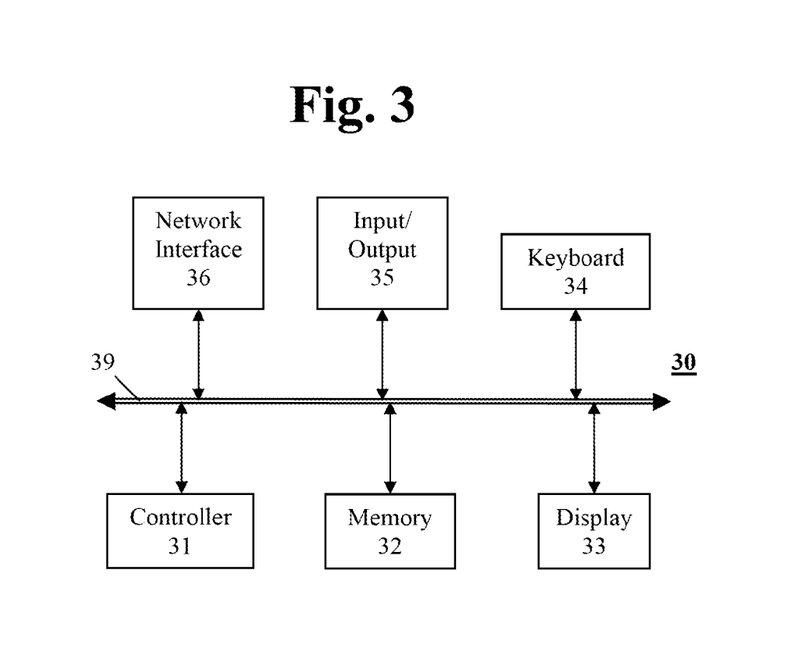
FIG. 3 shows a block diagram of an exemplary configuration of a terminal shown in FIG. 1.

An example of a configuration of the user terminal (for example, as a computer) is shown schematically in FIG. 3. In FIG. 3, computer 30 includes a controller (or central processing unit) 31 that communicates with a number of other components, including memory 32, display 33, keyboard (and/or keypad) 34, other input/output (such as mouse, touchpad, stylus, microphone and/or speaker with voice/speech interface and/or recognition software, etc.) 35, network interface 36 and print driver 37, by way of internal bus 39.

The memory 32 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 36 provides a connection (for example, by way of an Ethernet connection or other network connection which supports any desired network protocol such as, but not limited to TCP/IP, IPX, IPX/SPX, or Net-BEUI) to network 15.

A user interface is provided and is configured through software natively or received through a network connection, to allow the user to access electronic data or content on the terminal and/or via the network, interact with network-connected devices and services, enjoy other software-driven functionalities, etc. For example, a browser (such as Internet Explorer™, Netscape Navigator™, a proprietary browser, etc.) may be provided on the terminal so that a user of the terminal can use browsing operations to communicate with the management service 13 and/or access other data or content.

Additional aspects or components of the computer 30 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, the user terminal 16 is not limited to a personal computer, but can be manifested in a form of any of various devices that can be configured to communicate over a network and/or the Internet.

Figure 4:
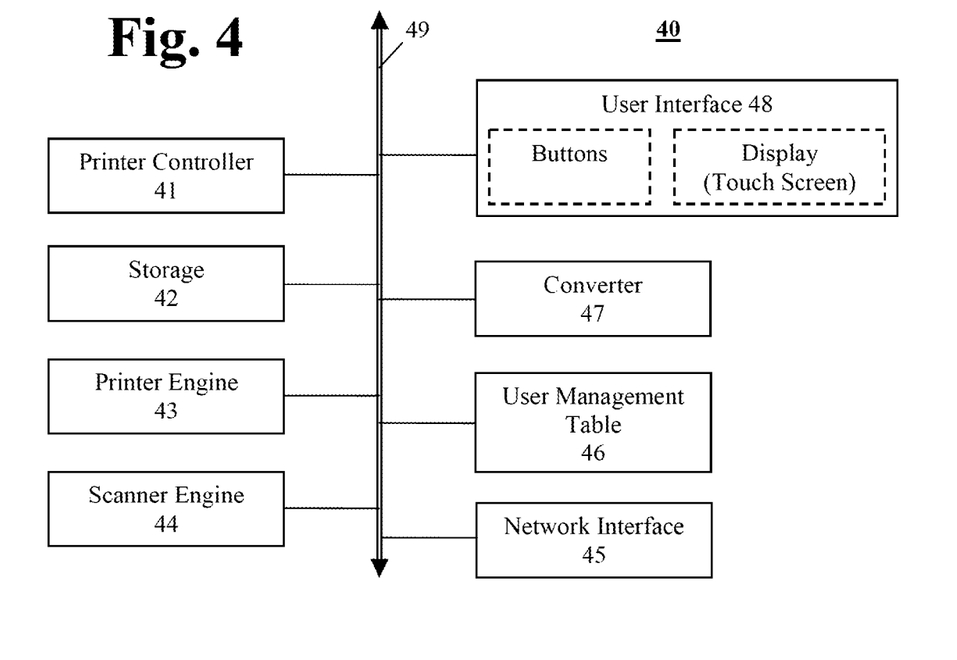
FIG. 4 shows a block diagram of a multi-function apparatus which can serve as a user terminal and/or as a database, according to an exemplary embodiment of this disclosure.

FIG. 4 shows an example of a multi-function device (MFD) or multi-functional peripheral device (MFP) which includes scanning and printing functions, and additionally can serve as a user terminal for entering, saving and accessing electronic data or documents. In addition, a MFP can include a resident database. Although the user terminal 16, database management part 18 and the database 19 are shown in FIG. 1 as distinct components, it should be understood that such components can be resident within a MFP device 110 (FIG. 11).

MFP apparatus 40 shown in FIG. 4 includes a controller 41, and various elements connected to the controller 41 by an internal bus 49. The controller 41 controls and monitors operations of the MFP 40. The elements connected to the controller 41 include storage 42 (for example, random access memory, read-only memory, hard disk drive, portable storage media drive such as for optical discs, magnetic discs, magneto-optical discs, etc., semiconductor memory cards, combinations of storage media, etc.), printer engine 43, scanner engine 44, network interface (I/F) 45, converter 47 for converting data from one format to another format (for example, a format suitable for printing, faxing, e-mailing, etc.), and user interface 48. The controller 41 also utilizes information stored in user management table 46 to authenticate the user and control user access to the functionalities of the MFP.

Storage 42 can include one or more storage parts or devices, and program code instructions can be stored in one or more parts or devices of storage 42 and executed by the controller 41 to carry out the instructions. Such instructions can include instructions for performing specified functions (such as printing, scanning, faxing, copying, e-mailing, etc.) of the MFP, to enable the MFP to interact with a terminal and/or the management service (for example, 13, 20, etc.), as well as perhaps other external devices, through the network interface 45, and to control the converter 47, access data in the user management table 46, and interactions with users through the user interface 48.

The user interface 48 includes one or more display screens that display, under control of controller 41, information allowing the user of the MFP 40 to interact with the MFP. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access the database 19 in system 10. As another example, the operator can scan a document, and use the browser to upload the image data from scanning of the document (and specify additional information associated with the image) to the database 19.

The display screen does not need to be integral with, or embedded in, a housing of the MFP, but may simply be coupled to the MFP by either a wire or a wireless connection. The user interface 48 may include keys and/or buttons (such as graphical keys or buttons, or other graphical elements, of a GUI on a touchscreen display) for inputting information or requesting various operations. Alternatively, the user interface 48 and the display screen may be operated by a keyboard, a mouse, a remote control, voice recognition, or eye-movement tracking, or a combination thereof.

Since the MFP 40 is typically shared by a number of users, and is typically stationed in a common area, the MFP preferably prompts the user to supply user credential or authentication information, such as user name (or other user or group information), password, access code, etc. The user credential or authentication information can be compared to data stored in the user management table 46 to confirm that the user is authorized to use the MFP. The user credential or authentication information may also be stored for the session and automatically supplied if access to other devices through the network requires it. On the other hand, such other devices may prompt the user to supply other user credential or authentication information through the user interface.

Other methods of authentication may also be used. For example, the multi-function device may be equipped with a card reader or one or more biometrics means (such as comparing fingerprints, palm prints, voice or speech, retinas or irises, facial expressions or features, signature, etc.).

Printer engine 43, scanner engine 44 and network interface 45 (similar to interface 23 in FIG. 2 and interface 36 in FIG. 3) are otherwise conventional, and therefore, a detailed description of such conventional aspects are omitted in the interest of clarity and brevity (so as not to mask the novel aspects of the subject matter of this disclosure).

The MFD 40 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 6:
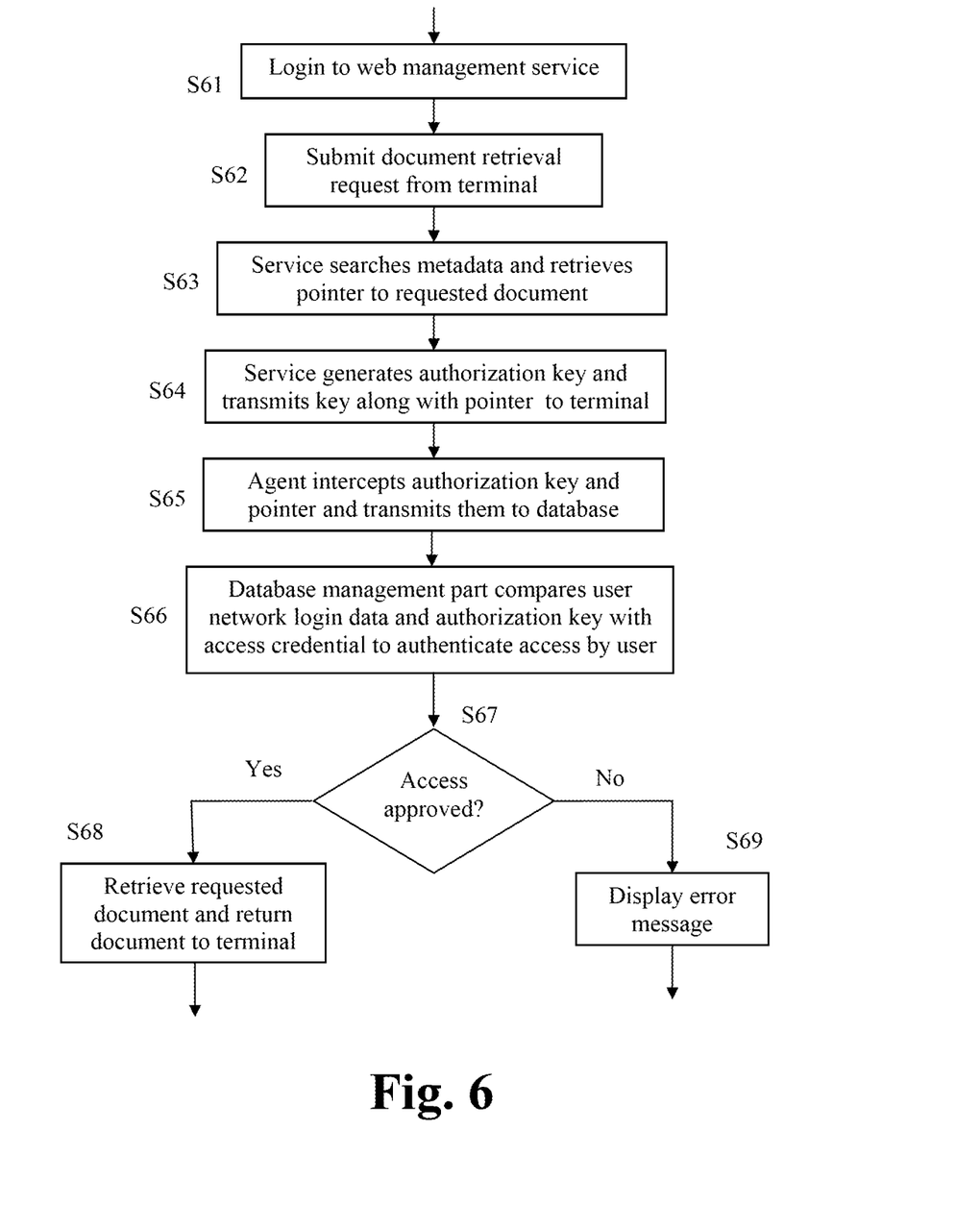
FIG. 6 a flow chart illustrating an example of a work flow in the exemplary embodiment of FIG. 1.

Another exemplary embodiment is described infra with reference to FIG. 6 which illustrates an example of a work flow in the exemplary embodiment.

In the example of FIG. 6, the user operates a browser on a user terminal to connect with the management service via the web and performs login (S61). After the user is authenticated, the management service provides a user interface to the user via the browser to enable the user to submit a document retrieval request (S62). Based on the document retrieval request, the management service searches the metadata maintained by the management service and retrieves a pointer to a requested document (S63). As mentioned above, the metadata maintained by the management service for a document stored in the document database can include properties information, such as author, creation date, data type, document contents information, etc., as well as a pointer to the physical address of the document.

Further, the management service generates an authorization key and transmits the key along with the pointer to the user terminal (S64). On the terminal side, an agent, on the user terminal or elsewhere in the intranet, intercepts the authorization key and the pointer, and transmits them to the database management part and document database (S65). The database management part compares the authorization key and the user's login data (obtained from, for example, the agent, the user terminal, a network directory, such as an Active Directory, etc.) with access credentials for the document to determine whether access by the user to the requested document is approved (S66). If access is approved (S67, Yes), the requested document is retrieved from the document database and transmitted to the user terminal (S68). On the other hand, if access through the access credential is not approved (S67, No), an error message indicating denial of access is transmitted to the user terminal (S69).

Figure 7:
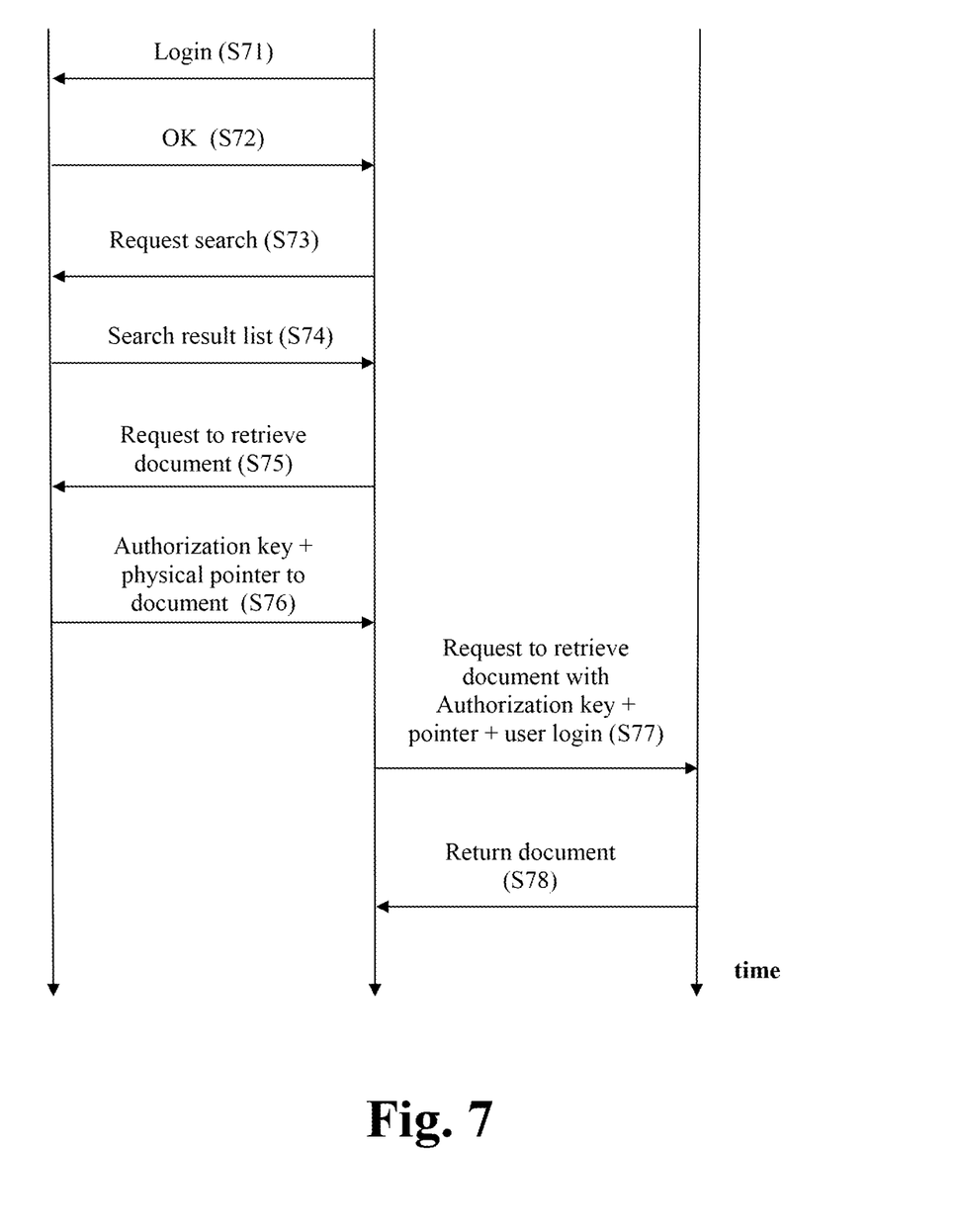
FIG. 7 shows a schematic view of an example of data flow in another exemplary embodiment.

A data flow in another exemplary embodiment will now be described with reference to FIG. 7.

The user logs-in through the web with the management service via HTTPS (or another secure connection), including entering user name and password (S71). The management service verifies the user's credential and approves access (S72). Next, the user utilizes a user interface provided by the management service through the web connection to input a search request (S73).

Based on the search request, the management service queries the metadata maintained by the management service and returns a list of search results (S74). The user reviews the search results and requests retrieval of one or more documents (S75). In response to the retrieval request, the management service returns to the user terminal an authorization key (since authentication has been established for this session) together with the physical pointer of the document location at the intranet side (S76).

After the authorization key and pointer are received on the terminal side, the user submits a request to retrieve the requested document accompanied with the authorization key and pointer and user login data to the database management part (for example, file server) and document database (S77). The database management part authenticates the user login data and the authorization key and then retrieves the requested document using the physical pointer, and returns the retrieved document to the user (S78).

Figure 8A:
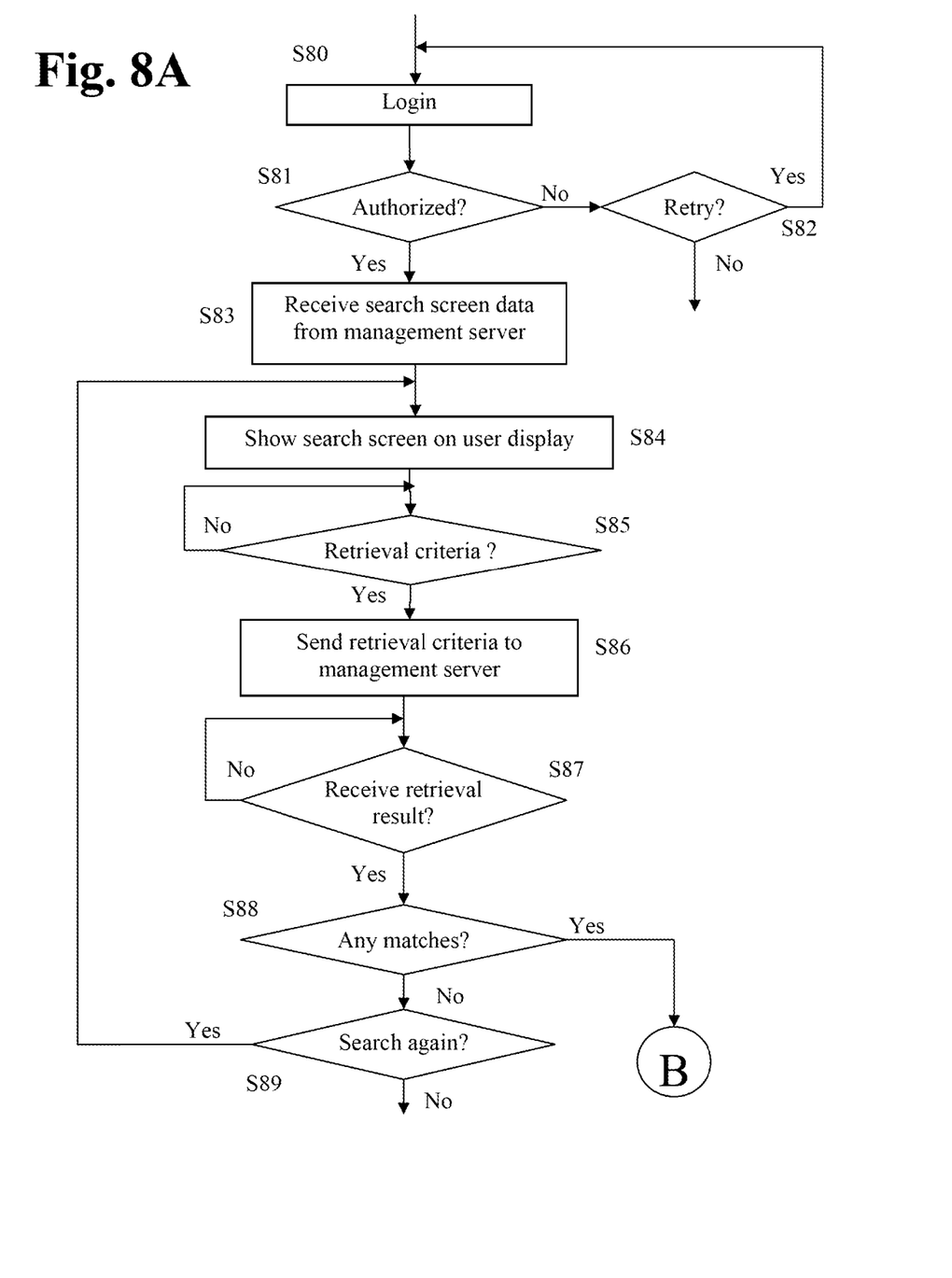
FIGS. 8A and 8B show a flow chart illustrating an example of a work flow on the user terminal side, in another exemplary embodiment.
Figure 8B:
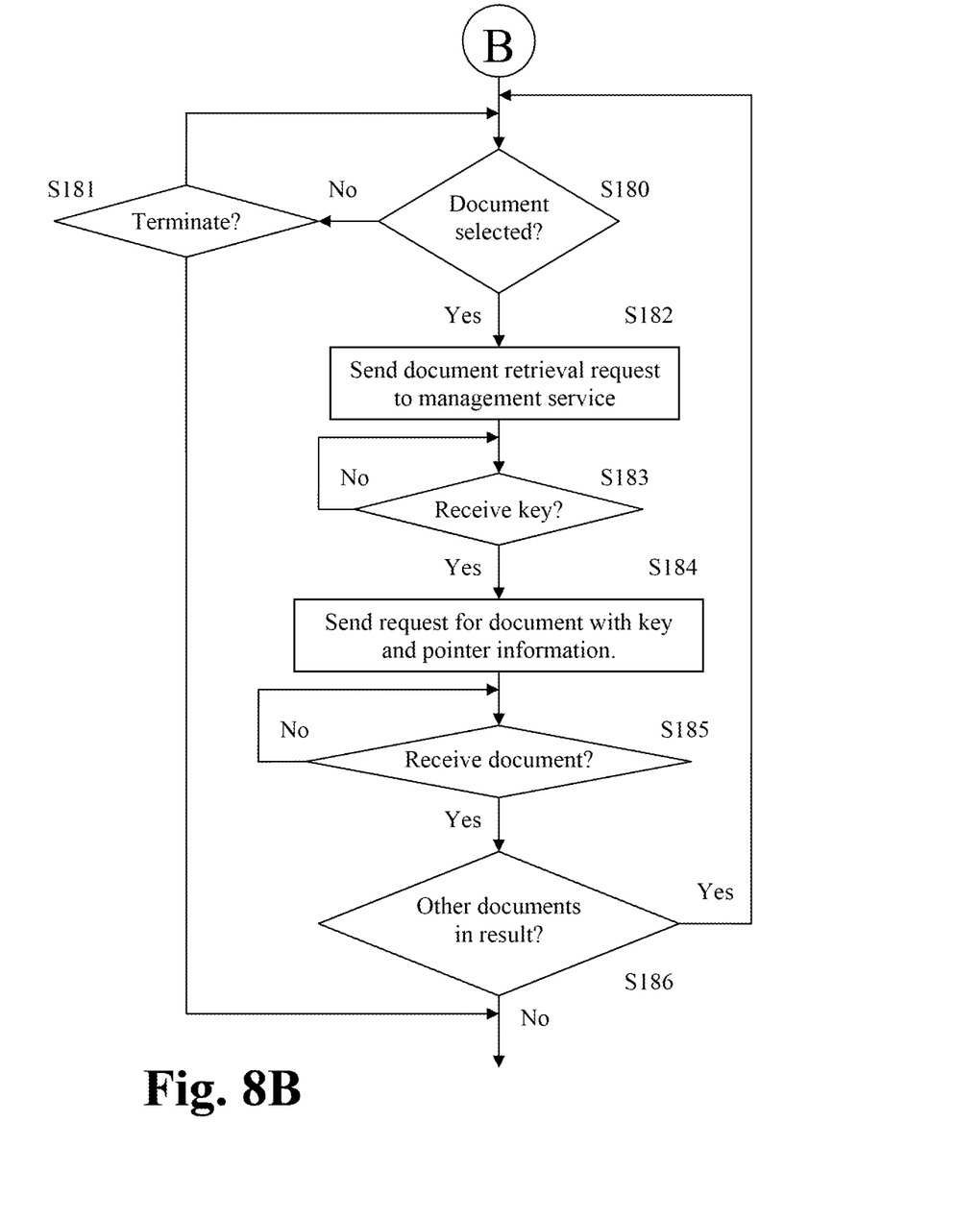

An example of a work flow on the user terminal side is described infra with reference to FIGS. 8A and 8B.

The user logs-in to the management service via the web, by operating the browser of the terminal (S80). If access to the management service is not granted (S81, No), it is determined whether the user is to be permitted to retry login (for example, different username, password, etc.) [S82]. If the user is not allowed to retry (S82, No), the process may terminate or a message may be displayed to indicate that access to the management service has been denied (not shown). If retry is permitted (S82, Yes), the process returns to login (S80).

After access has been granted (S81, Yes), the terminal receives user interface data for a search screen from the management service (S83), and the terminal displays the search screen (S84). It is monitored at the terminal side whether the user has set retrieval criteria (S85). If retrieval criteria has been set (S85, Yes), the retrieval criteria is sent to the management service (S86).

It is monitored at the terminal side whether results of the search has been received (S87). If search results have been received (S87, Yes), it is determined whether the search criteria matched any document or data, that is, whether there are any documents or data listed in the results (S88). If there are no matches (S88, No), the user interface allows the user to specify that he or she would like to search again (S89). If the user would like to search again (S89, Yes), the search screen is displayed again (S84). If the user does not wish to search again (S89, No), the process terminates.

If the search results indicate one or more matches (S88, Yes), it is monitored whether any of the documents or data are selected by the user (S180). If no documents or data have been selected after a timeout period (S180, No), it is determined whether the process should terminate (S181). For example, a user interface screen may be displayed to ask the user to choose whether to end the process or whether the user needs more time (not shown). If it is determined that the process should terminate (S181, Yes), the process ends. On the other hand, if it is determined that the process should not terminate (S181, No), monitoring for user selection of one of the documents displayed in the results continues (S180).

After one of the documents displayed in the results is selected (S180, Yes), a document retrieval request corresponding to the selected document is transmitted to the management service (S182). After the document retrieval request is transmitted, it is monitored at the terminal side whether an authorization key and pointer have been received (S183). After the authorization key and pointer have been received (S183, Yes), a request for the requested document along with the authorization key and pointer is transmitted from the terminal to the database or database management part (S184). Thereafter, it is monitored at the terminal whether the requested document has been received (S185).

After the requested document has been received (S185, Yes), the requested document, or a message indicating that the document has been received, is displayed, and it is determined whether there are remaining documents or data in the search results that have not been selected (S186). If there are not unselected documents or data in the search results (S186, No), the process ends. On the other hand, if there are unselected documents or data in the search results (S186, No), the search results screen may be displayed once again (S180).

Figure 9:
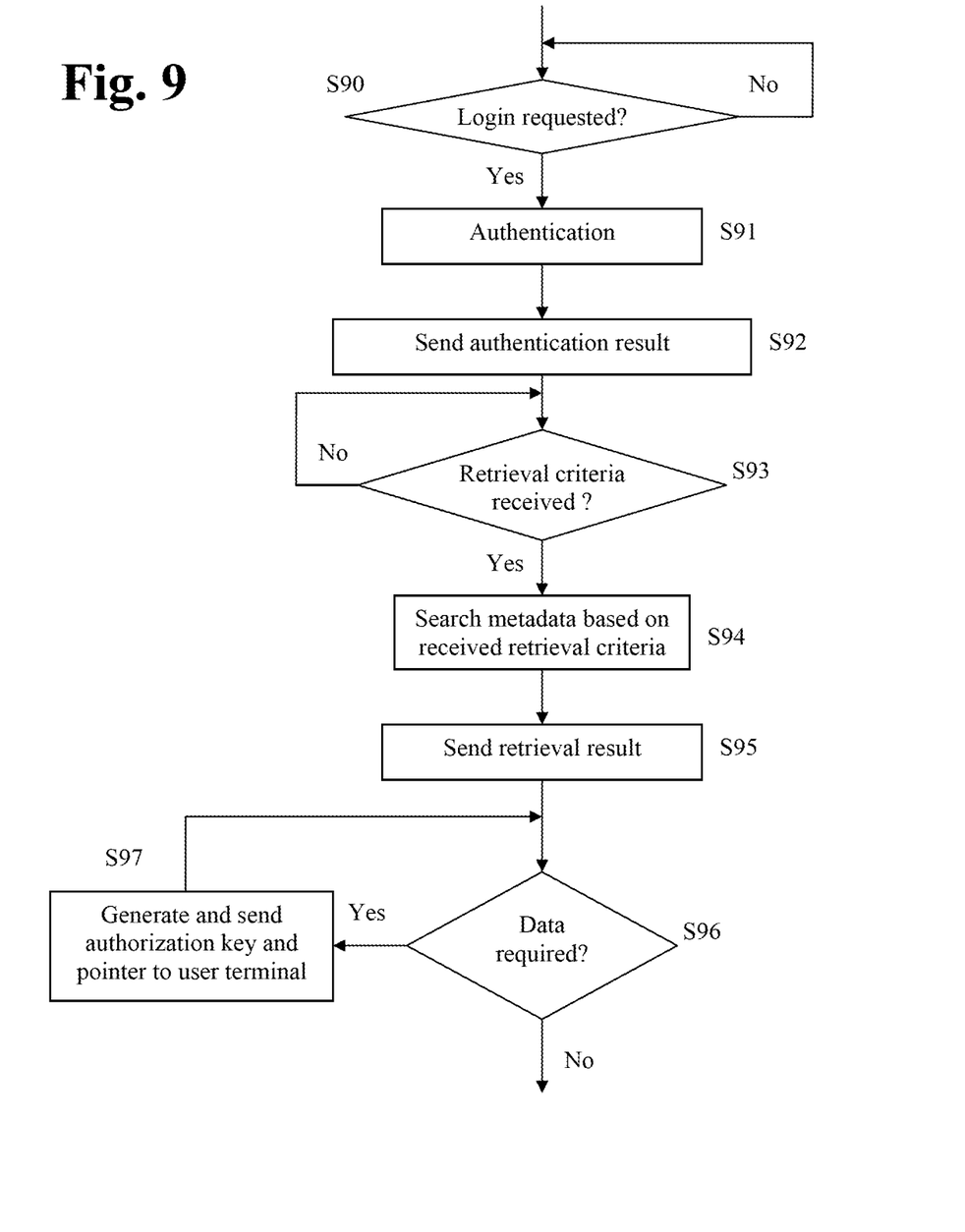
FIG. 9 shows a flow chart of an example of a retrieval process on the management service side, in another exemplary embodiment.

An example of a retrieval process on the management service side is described infra with reference to FIG. 9.

The management service monitors for a request to login (S90). After a login request is not received (S90, Yes), authentication is performed (S91), and the result of the authentication process is transmitted to the user terminal (S82, No).

User interface data for a search screen is transmitted to the user terminal, it is monitored at the management service side whether retrieval criteria has been received (S93). If retrieval criteria has been received (S93, Yes), metadata is queried based on the retrieval criteria (S94), and then the retrieval result is transmitted to the user terminal (S95).

After the retrieval result is transmitted, it is monitored at the management service side whether a document retrieval request has been received (S96). If a document retrieval request has been received (S96, Yes), an authorization key specific to the user is generated and transmitted along with pointer to the requested document to the user terminal (S97), and then the process returns to monitoring for another document retrieval request (S96). If a document retrieval request has not been received within a timeout period (S96, No), the process ends.

Figure 10:
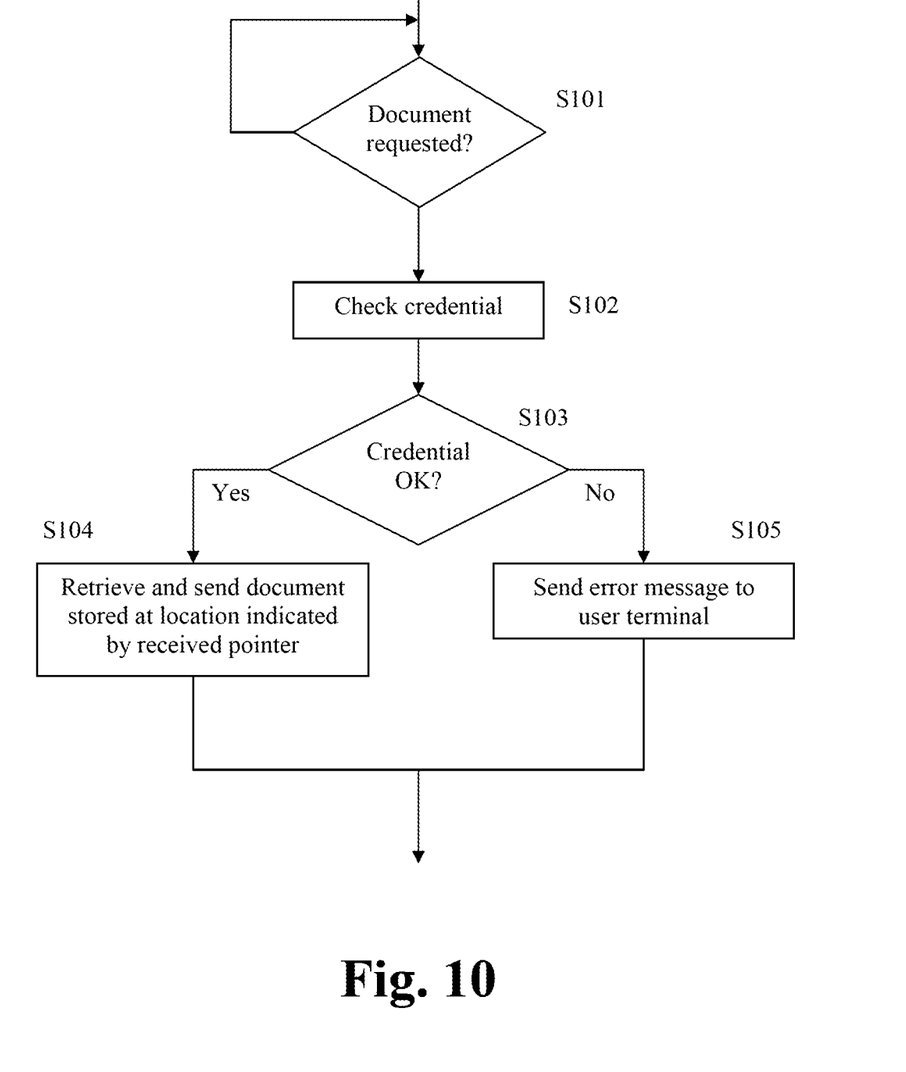
FIG. 10 shows a flow chart for a process performed at the document database side, in another exemplary embodiment.

A process performed at the document database side will now be described with reference to FIG. 10.

The database management part monitors for document requests (S101). After a document request is detected (S101, Yes), the authorization key, received with the request, and user credentials associated with the user requesting the document are compared to access credentials (that is, access to a document is typically limited) associated with the requested document (S103). As mentioned above, the user credentials may be received along with the request, may be obtained from another source such as a network directory, etc. If the credentials are satisfactory (S103, Yes), the requested document indicated by the pointer accompanying the request is retrieved and transmitted to the user terminal (S104). On the other hand, if the credentials are not satisfactory, an error message is transmitted to the user terminal, with or without explanation of why the credentials are unsatisfactory.

The above-mentioned methodologies, apparatuses and systems may be one or more computer programs which are executable by a computer and tangibly embodied in a program storage medium (such as optical disks, magneto-optical disks, floppy diskettes, ROMs, RAMs, EPROMs, EEPROMs, FLASH memory, any type of media suitable for storing electronic instructions, etc.) readable by a computer. The program(s) may include a plurality of parts, executions of which may be distributed over a plurality of computers, terminals or other electronic devices which communicate with each other over a network or other transmission media.

The above-mentioned examples and exemplary embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for secure access of electronic data, said system comprising:
 a document database;
 a management service configured to manage access to the document database and receive user credential information and receive a document retrieval request through a network, perform user authentication by using the user credential information, and if said user credential information was authenticated, transmit, in response to said document retrieval request, an authorization key and a pointer indicating a physical address of a requested document in said document database;
 a multi-function apparatus shared by a plurality of users and configured for secure access of electronic data corresponding to electronic documents in the document database, the multi-function apparatus including:
  a user interface including a touch screen display to display user interface screens provided for each authorized user amongst the plurality of users, upon login and authentication of the authorized user, to request retrieval of an electronic document stored in the document database, to request a print operation to print the retrieved document locally, to request a scan operation to scan an input document locally, and to upload one or more scanned document images to the document database;
  a scanner engine including hardware to scan a hard copy of the input document and generate a document image from the scanned document, to perform the scan operation, and upload the document image to the document database after receiving the upload instruction from the user via the user interface locally;
 a database management part configured to retrieve specified data from the document database, the database management part being separated by at least a network from the management service that manages access to the document database, each of the network, the management service and the document database being external to the multi-function apparatus;

a document request part configured to transmit user credential information and transmit the document retrieval request by the user through the network to the management service;

an authorization processing part configured to (i) intercept from said management service, in a case that said user credential information is authenticated by said management service, an authorization key and a pointer indicating a physical address of a requested document in said document database, and (ii) automatically transmit to the database management part, user authentication information, said pointer, said authorization key and a specified request to retrieve the requested document;

a printer engine including hardware to perform a print operation by printing a hard copy of the retrieved document retrieved from the document database after receiving the print instruction from the user via the user interface locally; and a data monitor part that monitors for access events of accesses of electronic documents stored, or to store, in said document database, and when an access of a specific document stored, or to store, in said document database occurs, the data monitor part captures access event metadata corresponding to the access of the specific document and transmits the access event metadata through the network to the management service, to cause the management service to update, based on the access event metadata corresponding to the access of the specific document, a metadata record maintained for the specific document, wherein the access event metadata corresponding to the access of the specific document and transmitted by said data monitor part to the management service includes a hyperlink to the specific document after the access, wherein image data corresponding to the scan operation and the print operation and metadata maintained for said image data are stored in the document database and are retrievable from the document database upon user authentication performed on the user interface by a user who has access to said image data and said metadata, and wherein said database management part compares the user authentication information and the authorization key with access credentials associated with the requested document, and if the specified request to retrieve the requested document is authenticated based on the comparison, said database management part retrieves from said document database the requested document indicated by the pointer and transmits the retrieved document to said document request part.

2. The system as claimed in claim 1, wherein said management service maintains searchable metadata corresponding to properties of the electronic documents stored in said document database.

3. The system as claimed in claim 2, wherein said user interface is configured for user entry of the user credential information and for user entry of a search request, and said document request part transmits the user credential information and the search request to the management service.

4. The system as claimed in claim 3, wherein when said management service receives the search request and the user credential information from said document request part, said management service performs user authentication and if said user credential information is authenticated, said management service searches, based on said search request, the metadata maintained for the electronic documents stored in said document database and transmits search results to the document request part.

5. The system as claimed in claim 4, wherein when said management service receives said document retrieval request, transmitted by said document request part based on user selection of one or more documents from said search results, said management service generates the authorization key for accessing the selected document and generates the pointer based on a hyperlink maintained in the metadata for the selected document.

6. The system as claimed in claim 3, wherein said document request part receives from the management service search results for the search request from the document request part, and forwards the search request results to the user interface for display to the user.

7. The system as claimed in claim 6, wherein said document request part forms said document retrieval request, based on user selection of one or more documents in said search results through said user interface.

8. The system as claimed in claim 3, wherein said user authentication information transmitted by said authorization processing part to said database management part is based on the user credential information received through the user interface.

9. The system as claimed in claim 1, wherein said document request part outputs the retrieved document through the user interface.

* * * * *